(12) United States Patent
Gindele et al.

(10) Patent No.: US 8,216,428 B2
(45) Date of Patent: *Jul. 10, 2012

(54) SCREEN

(75) Inventors: Wolfgang Gindele, Schlier (DE);
Wemer Brettschneider, Ravensburg (DE)

(73) Assignee: Voith Patent GmbH, Heidenheim (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/272,962

(22) Filed: Oct. 13, 2011

(65) Prior Publication Data

US 2012/0024763 A1 Feb. 2, 2012

Related U.S. Application Data

(63) Continuation of application No. 12/608,141, filed on Oct. 29, 2009, now Pat. No. 8,123,912, which is a continuation of application No. PCT/EP2008/051602, filed on Feb. 11, 2008.

(30) Foreign Application Priority Data

Apr. 30, 2007 (DE) .......................... 10 2007 020 325
Nov. 7, 2007 (DE) .......................... 10 2007 000 640

(51) Int. Cl.
*D21H 23/00* (2006.01)

(52) U.S. Cl. ....................................................... 162/380

(58) Field of Classification Search .................. 162/380, 162/251, 261; 29/428, 525; 210/415, 498; 209/270, 379

See application file for complete search history.

(56) References Cited

U.S. PATENT DOCUMENTS

| 5,023,986 | A | 6/1991 | Gero et al. |
| 5,041,212 | A | 8/1991 | Gero et al. |
| 5,665,207 | A | 9/1997 | Aikawa |
| 6,254,729 | B1 | 7/2001 | Doelle et al. |
| 6,905,032 | B2 | 6/2005 | Brettschneider et al. |

FOREIGN PATENT DOCUMENTS

| DE | 195 47 585 A1 | 12/1996 |
| EP | 0651091 A1 | 3/1995 |

*Primary Examiner* — Mark Halpern
(74) *Attorney, Agent, or Firm* — Taylor IP, P.C.

(57) ABSTRACT

The present invention relates to a method for the production of a screen and to a screen for the treatment of a fibrous material suspension suitable for the production of a fibrous material web, the screen including at least two screen layers that are connected to each other and have apertures, at least some of the apertures being arranged in such a way that the result is screen openings leading through the screen. The production of the screen is simplified in that some of the apertures are arranged in such a way that the result is recesses on the front side of the screen which do not pass through the screen, and at least the apertures forming the recesses are introduced into the screen layers before the latter are connected.

14 Claims, 1 Drawing Sheet ized in the embodiments described below are not intended to be exhaustive or to limit the invention to the precise forms disclosed. Rather, the embodiments are chosen and described so that others skilled in the art may utilize their teachings.

SCREEN

CROSS REFERENCE TO RELATED APPLICATIONS

This is a continuation of U.S. patent application Ser. No. 12/608,141 entitled "SCREEN" which was filed on Oct. 29, 2009 now U.S. Pat. No. 8,123,912. U.S. patent application Ser. No. 12/608,141 is a continuation of PCT application No. PCT/EP2008/051602, entitled "SCREEN", filed Feb. 11, 2008, each of which is incorporated herein by reference.

BACKGROUND OF THE INVENTION

1. Field of the Invention

The present invention relates to a method for the production of a screen and to a screen for the treatment of a fibrous material suspension suitable for the production of a fibrous material web, the screen including at least two screen layers that are connected to each other and have apertures, at least some of the apertures being arranged in such a way that the result is screen openings leading through the screen.

2. Description of the Related Art

Screens of this type are used for the wet screening of fibrous material suspensions in order to remove contraries present therein. The characteristics of such a screen result substantially from the size, shape and number of screen openings located therein. These screens are advantageously used in pulpers and separators for stock preparation. In addition to a high throughput, the aim is also high resistance to the hydraulic pressure. In order to be suitable for this purpose, in DE19547585 a screen having a supporting layer and a screening layer is proposed.

For an extremely wide range of reasons, however, it can also be necessary to provide the front side of the screen with recesses, which is normally even more complicated than the production of the screen openings.

What is needed in the art is a method for simplifying the production of screens having recesses and their construction.

SUMMARY OF THE INVENTION

The present invention provides a method for the production of a screen and to a screen for the treatment of a fibrous material suspension suitable for the production of a fibrous material web including a plurality of apertures wherein some of the apertures are arranged in such a way that the result is recesses on the front side of the screen which do not pass through the screen.

For the production process, at least the apertures forming the recesses are introduced into the screen layers before the latter are connected. In this way, the recesses can be produced much more simply and usually also more accurately.

In order to be able to utilize the advantages comprehensively, as far as possible all the apertures should be introduced into the screen layers before the latter are connected. This is already much simpler because of the low thickness of the screen layers and is possible by means of punching and laser cutting but, for example, also by means of milling, drilling, etching and so on.

Depending on the required stability of the screen, the configuration of the front side of the screen and of the openings, the screen may be produced from or include four or more than four screen layers.

In particular, the cross-sectional profile of the screen openings, if, for example, starting from the front side, widen in the direction of flow or run obliquely and, with a relatively large number of screen layers, can be configured to be continuous, i.e. with no or small discontinuities.

In addition, the production of the apertures, in particular in relation to the production of fine screens in the case of more and, therefore, thinner screen layers, is simpler and normally more accurate. On the other hand, a higher number of screen layers, of course, also increases the production costs.

The screen layers should be connected as flat as possible and this can be implemented in by brazing, welding, screw fixing or adhesive bonding. For many applications, it is advantageous if the recesses form grooves or blind drilled holes.

Disruptive bars protruding beyond the front side can be fixed in the recesses. In addition, the disruptive bars can be fixed to the screen, for example, screwed on. These disruptive bars can assist the through-flow effect of the screen, generate turbulence, reduce wear on the screen and form tearing edges. They are primarily applied in arrangements in which a rotor is arranged in front of the front side of the screen. The interaction of rotor and wearing bars in this case contributes to conveying the contraries out of the center of the vortex. In addition or alternatively, however, the screen layers may have the apertures forming the recesses themselves formed as disruptive elements. In this way, the fitting of disruptive elements, in particular disruptive bars, can be dispensed with entirely.

In order to be able to ensure a sufficient function and stability of the disruptive elements but also a secure connection between the screen layers, the recesses should form between 3 and 50%, for example, between 5 and 30%, of the surface of the front side of the screen coming into contact with the fibrous material suspension.

In the interests of a long lifetime, irrespective of the configuration of the screen, the screen layer forming the front side of the screen should have a higher resistance to wear than other screen layers.

For the production, the screen layers may have a thickness between 1 and 20 mm, preferably between 1 and 10 mm. In order to ensure sufficient stability, the screen may have a total thickness between 4 and 100 mm, for example, between 6 and 50 mm. The advantages in the production of the multilayer screen come to fruition as compared with screens without screen layers if the screen openings have an extent between 1 and 20 mm, for example, between 4 and 20 mm, at the narrowest point.

The present invention can be applied in flexible screens but, in particular, also in rigid screens.

In accordance with the demands on the stability and the wear, the screen layers should not consist of the same material, in order to minimize the material costs and the weight.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
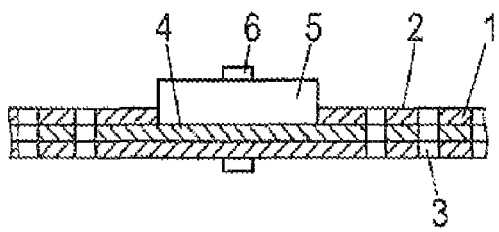
FIG. 1 shows a partial section through a screen with disruptive bar 5.

Referring now to the drawings, the common factor in all the embodiments of the present invention is that the rigid, circular screen of a separator of an arrangement for preparing a fibrous material suspension for a paper machine includes a plurality of screen layers 1. In this case, a rotating screen cleaner, not illustrated, is arranged in front of the screen in the flow direction.

Figure 2:
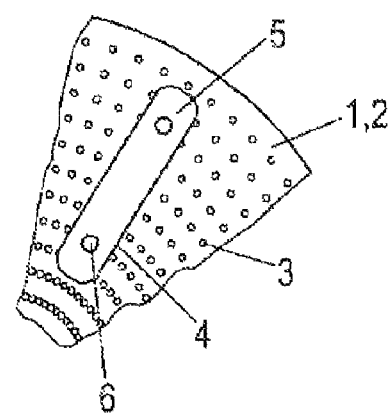
FIG. 2 shows a plan view according to FIG. 1.

Screen layers 1 have a thickness between 1 and 5 millimeters and are brazed to one another. Before the connection of screen layers 1, however, apertures are punched into the latter and, in the screen, form recesses 4 on front side 2 of the screen coming into contact with the fibrous material suspension, and penetrating screen openings 3. While recesses 4 in FIGS. 1 and 2 are formed only by outer screen layer 1, this is done by two outer screen layers 1 in FIGS. 3 and 4.

Because of the low thickness of screen layers 1, the apertures can be produced relatively simply and accurately.

In order to minimize the wear, screen layer 1 forming the front side is formed from very wear-resistant material. Screen layers 1 lying underneath must ensure the stability of the screen and can in particular consist of less expensive and/or lighter-weight material.

Screen openings 3 have an extent between 4 and 20 millimeters at the narrowest point.

In the embodiment shown in FIGS. 1 and 2, the screen comprises three screen layers 1 lying one above another and connected flat to one another. In this case, recesses 4 are formed as grooves, into which disruptive bars 5 are plugged. Elongated disruptive bars 5 protrude beyond front side 2 of the screen and are intended to reduce the wear of the screen, to generate turbulence, to clean contraries out of the center and to form working edges for the deflaking.

Via recesses 4, disruptive bars 5 are already provided with secure fixing to the screen. For the purpose of reinforcement, however, disruptive bars 5 are further connected to the screen via screws 6.

Figure 3:
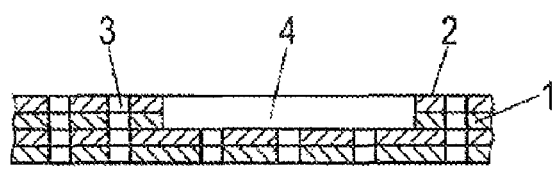
FIG. 3 shows a partial section through another screen having recesses 4.
Figure 4:
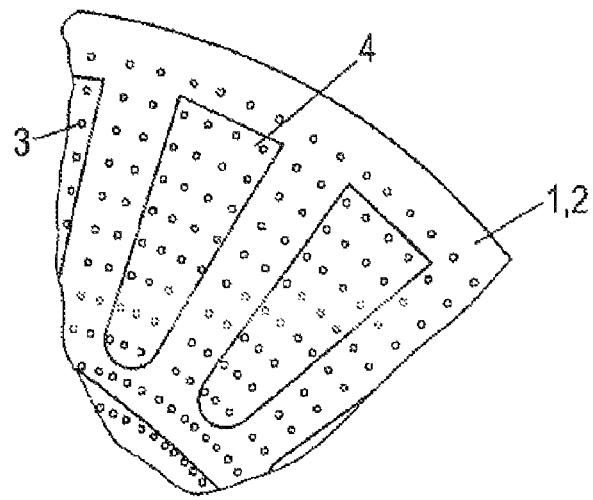
FIG. 4 shows a plan view according to FIG. 3.

The screen shown in FIGS. 3 and 4 includes four screen layers 1 lying one above another. Since here recesses 4 are formed by two screen layers 1, these are also relatively deep.

However, it is important here that the recesses form between 5 and 30% of the surface of front side 2 of the screen coming into contact with the fibrous material suspension. This large extent of recesses 4 makes it possible for screen layers 1 having the apertures forming recesses 4 themselves to be able to act as disruptive elements. In this way, the complicated fitting of disruptive bars 5 can be dispensed with.

In addition, screen openings 3 here can be found in and outside recesses 4.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A screen for the treatment of a fibrous material suspension suitable for the production of a fibrous material web, the screen comprising:
at least two screen layers connected to each other, each of said at least two screen layers having a plurality of apertures including at least a first portion of said apertures configured to be arranged to form a plurality of screen openings leading through the screen and a second portion of said plurality of apertures configured to be arranged to form a plurality of recesses on a front side of the screen, wherein said recesses do not pass through the screen and are configured to form a plurality of elongate grooves.

2. The screen according to claim 1, wherein the screen comprises three screen layers.

3. The screen according to claim 1, wherein a cross-sectional profile of said screen openings continuously widens in a direction of flow from said front side of the screen to a back side of the screen.

4. The screen according to claim 1, wherein a cross-sectional profile of said screen openings run continuously obliquely in a direction of flow from said front side of the screen to a back side of the screen.

5. The screen according to claim 1, wherein said at least two screen layers are connected by one of brazing, welding, screw fixing and adhesive bonding.

6. The screen according to claim 1, wherein said at least two screen layers are each composed of a different material.

7. The screen according to claim 6, wherein a screen layer on said front side of the screen has a higher resistance to wear than another screen layer of said at least two screen layers.

8. The screen according to claim 1, wherein the screen has a thickness between approximately 1 and 20 millimeters (mm).

9. The screen according to claim 8, wherein the screen has a total thickness between approximately 4 and 100 mm.

10. The screen according to claim 9, wherein the screen has a total thickness between approximately 6 and 50 mm.

11. The screen according to claim 10, wherein said screen openings have an extent between approximately 1 mm and 20 mm.

12. The screen according to claim 11, wherein said extent is between approximately 4 and 20 mm.

13. The screen according to claim 1, wherein the screen is rigid.

14. A screen for the treatment of a fibrous material suspension suitable for the production of a fibrous material web, the screen comprising:
at least two screen layers connected to each other, each of said at least two screen layers having a plurality of apertures including at least a first portion of said apertures configured to be arranged to form a plurality of screen openings leading through the screen and a second portion of said plurality of apertures configured to be arranged to form a plurality of recesses on a front side of the screen, wherein said recesses do not pass through the screen and are configured to form a plurality of elongate grooves and further comprising a plurality of disruptive bars fixed in said recesses and protruding beyond said front side of the screen.

* * * * *